United States Patent Office 3,502,483
Patented Mar. 24, 1970

3,502,483
COLD WATER-SOLUBLE EUCHEUMA
GEL MIXTURES
Martin Glicksman, Valley Cottage, Elizabeth Farkas, Yonkers, and Robert Edward Klose, Bronx, N.Y., assignors to General Foods Corporation, White Plains, N.Y., a corporation of Delaware
No Drawing. Filed Aug. 29, 1966, Ser. No. 575,522
Int. Cl. A23l *1/04;* A23g
U.S. Cl. 99—131                                      4 Claims

ABSTRACT OF THE DISCLOSURE

A cold water soluble gel-producing mixture containing cold water soluble sodium, potassium or ammonium salts of Eucheuma. A quick setting modification is made by incorporating a slightly soluble calcium salt, or a soluble calcium or potassium salt. In the latter case, the Eucheuma salt and the soluble calcium or potassium salt is packaged separately and dissolved in water separately as formation of a gel upon dissolution of the two components in water is immediate.

BACKGROUND OF THE INVENTION

In the past there has been great interest in discovering and manufcaturing food products that can be prepared with little or no effort and in a very short time by the housewife. There has recently been considerable activity in the field of instant desserts, particularly desserts of the gelatin and pudding type. The food industry has spent a great deal of time and money trying to find a method of preparing gel-type foods that can be prepared without the necessity of heating and which will be ready to eat immediately after preparation.

A recent advance in the science of cold water-soluble gels has been the discovery of calcium alginate gels which are prepared by reacting soluble sodium alginate, a product made from an extract of brown seaweed, with calcium ions, thereby forming the insoluble calcium alginate gel. Calcium alginate systems have not, however, been satisfactorily used extensively in the preparation of desserts and salads based on gels because they are very sensitive to sodium ions. Thus the calcium alginate gel easily reverts to the soluble sodium alginate when sodium ions are present as is often the case in food preparations such as aspic-type salads. Another major disadvantage of alginate-based gel systems is that they are very sensitive to hardness in water and the firmness of the gel formed will vary critically in different parts of the country as the hardness of the water varies. It would be impossible to market an alginate-based gel type food mix yielding a consistent product unless distilled water were always used to make the gel. A third disadvantage of importance in considering alginate gelling systems for desserts is that calcium alginate forms a more brittle gel, i.e., it will not melt in the mouth of the person eating it. This disadvantage renders dessert food products made from this gelling agent distasteful because of its poor eating qualities.

The only pertinent references related to Eucheuma gelling systems are the Tjoa Patent 2,811,451 and the Glicksman patent, 3,250,721. The Tjoa patent teaches the basic concept of using Eucheuma extract as a gelling agent and discusses the various gelling properties that can be obtained by extracting the Eucheuma at different temperatures. The Glicksman patent discloses a method of preparing a Eucheuma gel that can be frozen and thawed without undergoing syneresis. The gel products made in accordance with the teachings of these patents are subject to the drawback that they must be heated before a gel will form.

ADVANTAGES AND OBJECTS OF THE INVENTION

The cold water-soluble gelling system of the instant invention does not have any of the shortcomings mentioned above. Gelled foodstuffs, such as gelatin-like desserts and salads, prepared with Eucheuma extract modified according to this invention are inert to the minerals present in hard water so that the formulations of a food product made according to the invention need not be dependent upon the area of the country in which the product is used. Further, the gelling system of the present invention can be used to make gelatin-like vegetable salads which desirably contain sodium chloride as a flavor enhancer without the danger of the product becoming soft due to syneresis. Thirdly, gels made from the instantly-described modified Eucheuma extract melt easily and uniformly in the mouth, thereby providing the pleasing sensation of smooth getaway normally associated with superior gelatin-like foods. Lastly, the gelled product of the instant invention can be prepared simply by mixing the ingredients in cold water and permitting the mixture to stand for a few minutes.

Accordingly, it is an object of the present invention to provide a modified Eucheuma extract that is cold water-soluble. It is a further object of the invention to provide a method of preparing cold water-soluble quick setting gelatin-like food products. It is a still further object to provide cold water-soluble quick-setting gelatin-like food products. These and other objects of the invention will be obvious from the following description and examples.

DESCRIPTION OF THE INVENTION

According to the present invention commercial extracts of Eucheuma seaweed are converted to a water-soluble form by the usual means of ion exchange. Eucheuma is a member of the red algae family and exists in various species. The preferred seaweed species are *Eucheuma spinosum* and *Eucheuma muricatum* although other related species of Eucheuma may be employed with satisfactory results. These species are very common to the coastal waters of Indonesia. The colloid is hot water extracted from the seaweed and dried. The dried colloid, as it is commercially available, is substantially in the form of the calcium salt. This product is not soluble in cold water so that when used in aqueous food products hot water must be used to dissolve the colloid.

In the accompanying examples the dried Eucheuma extract was dissolved in water and contacted with an ion exchange resin for a period of time sufficient to convert substantially all of the calcium salts to the particular salt intended, i.e., the sodium, potassium or ammonium salts. The soluble salts was then separated from the ion exchange resin by any suitable method, as by filtration. In the commercial preparation the sodium, potassium or ammonium salts of the Eucheuma extract can be prepared by treating the extract prior to its purification and extraction if desired, that is, while it is still in the seaweed form. The salt can then be separated from the seaweed as a cold water-soluble salt. If the dried commercial calcium salt is used, the conversion can be effected by simply disolving the extract in hot water and passing it through an ion exchange tower. Although ion exchange procedures were employed in the accompanying examples the method of preparing the cold water-soluble salts of the present invention is not critical and other processes can be used such as dissolving the dried commercial form of the extract in hot water and treating it with a basic solution such as the hydroxides of sodium, potassium or ammonium.

The resulting cold water-soluble Eucheuma salt has good gel-forming properties. This is unexpected since other members of the red algae family such as agar, carrageenan, furcellaran, etc. will not form satisfactory gels in their sodium, potassium or ammonium salt forms when dissolved in cold water. In using the cold water-soluble colloid as a gelling agent it is simply dry mixed with the other ingredients of the food formulation. The gel forms when the dissolved mix is refrigerated at about 45° F.

As a modification of the invention a quick-setting gel can be formed by causing calcium or potassium ions to react with the sodium eucheuman in the basic formulation. When a slightly soluble calcium salt such as calcium sulfate is used in the formulation, an acid such as adipic acid must be used to control the rate of release of the calcium ions into solution. If the pH of the solution is too high the calcium ions will not go into solution while if the pH is too low the calcium sulfate will dissolve too rapidly thereby causing the gel to form in discontinuous particles. When preparing the quick-setting food mix the calcium sulfate and acid, both in dry form, are blended with the basic formulation. To make the gelled food one need only dissolve the contents of the package in water and after thorough mixing allow the solution to stand for a few minutes at which point a gel will form.

When using a potassium salt or a soluble calcium salt to accelerate the gelation the reaction between the sodium eucheuman and the potassium is so rapid that if all of the ingredients are added to water together a very uneven gel results. To avoid this difficulty the basic ingredients and the potassium salt are separately packaged. When preparing the food product the contents of the two packages are separately dissolved in water and the resulting solutions mixed. A gelatin-like product results immediately upon mixing. As shown in the following examples the potassium-accelerated food preparation gels considerably faster than the plain sodium Eucheuman based mix or the slightly soluble calcium-accelerated mix. In the quick-setting modification it does not matter whether the basic salt is sodium Eucheuman, potassium Eucheuman or ammonium Eucheuman. The gel will still set quickly when the calcium or potassium ions come into contact with the basic mix in solution.

In order that the invention may be better understood the following examples will serve to illustrate specific applications of the invention.

Example I

Fifty grams of commercial Eucheuma extract (Gelcarin DG) produced by Marine Colloids, Inc. was dissolved in 2500 ml. of water at 85° C. Two hundred grams of a sodium ion exchange resin (Amberlite IR–120–Na) was added to the solution and the mixture stirred for 20 minutes while maintaining the temperature of 85° C. The resin was then removed by decanting and filtering the mixture through cheese-cloth. The liquid filtrate was drum-dried on a Buflovak double drum dryer at 50 p.s.i.g. steam pressure and 2 r.p.m. drum speed. The dried product was ground through a fine mesh screen yielding a cold water-soluble powder.

Example II

A powdered gel-producing dessert mix was prepared using the modified Eucheuma extract prepared in Example I by dry blending the following ingredients:

| | G. |
|---|---|
| Sodium modified Eucheuma extract | 4.8 |
| Sugar | 47.5 |
| Adipic acid | 1.5 |
| Salt | 0.15 |
| Color | 0.085 |
| Flavor | 0.275 |
| | 54.310 |

The dry mix was dissolved in 237 ml. of cold water (55° F.) and placed in the refrigerator. Upon cooling overnight, a spoonable gel was formed.

Example III

A powdered gel-producing dessert mix was prepared using the modified Eucheuma extract prepared in Example I by dry blending the following ingredients (5494–36):

| | G. |
|---|---|
| Sodium modified Eucheuma extract | 2.4 |
| Sugar | 47.5 |
| Adipic acid | 1.5 |
| Salt | 0.15 |
| Color | 0.085 |
| Flavoring | 0.275 |
| Calcium sulfate, anhydrous powder | 0.3 |
| | 52.210 |

The dry mix was dissolved in 237 ml. of cold water. A gel formed within 10 minutes which could be spooned and eaten.

Example IV

A 2-package powdered gel-producing dessert mix was prepared using the sodium modified Eucheuma extract prepared in Example I by making the following dry mix formulations (5494–34):

Package (a):

| | G. |
|---|---|
| Sodium modified Eucheuma extract | 2.4 |
| Sugar | 47.5 |
| Adipic acid | 1.5 |
| Salt | 0.15 |
| Coloring | 0.085 |
| Flavoring | 0.275 |
| | 51.910 |

Package (b):
Potassium citrate crystals _____ 2.4

The contents of package (a) was dissolved in 197 ml. of cold water. Contents of package (b) was dissolved in 40 ml. of cold water and the resulting solution was added to the first solution and stirred until uniformly mixed. A gel formed in about 5 minutes which could be spooned and eaten.

Although the claims are directed only to the improvement of food products it is understood that the present invention can be used in non-food applications such as the preparation of photographic gels, etc. and the breadth of the invention is limited only by the scope of the appended claims.

What is claimed is:

1. A cold water-soluble gel-producing dry food mixture comprising a cold water-soluble gelling sodium Eucheuma salt and an edible acid.

2. A cold water-soluble, quick-setting gel-producing dry food mixture comprising a coldwater-soluble Eucheuma salt selected from the group consisting of sodium, potassium, and ammonium salts, an edible acid, and a slightly soluble calcium salt, said calcium salt being present in an amount sufficient to produce a quick-setting gel.

3. A two-package, cold water-soluble, quick-setting gel-producing dry food mixture comprising a first package containing a cold water-soluble salt of Eucheuma selected from the group consisting of sodium, potassium and ammonium salts and a second package containing a salt selected from the group consisting of potassium salts and soluble calcium salts, said salts being present in amounts sufficient to produce a quick-setting gel wherein the food is prepared by separately dissolving the contents of each package in water and blending together the resulting solutions.

4. The mixture of claim 3 wherein the second package contains a potassium salt.

References Cited

UNITED STATES PATENTS

| | | | |
|---|---|---|---|
| 2,427,594 | 9/1947 | Frieden et al. | 99—131 |
| 2,811,451 | 10/1957 | Tjoa | 99—131 |
| 3,094,517 | 6/1963 | Stanley | 99—131 XR |
| 3,250,621 | 5/1966 | Glicksman et al. | 99—131 |

OTHER REFERENCES

Whistler: Industrial Gums, Academic Press, New York, 1959, p. 152.

A. LOUIS MONACELL, Primary Examiner

J. M. HUNTER, Assistant Examiner

U.S. Cl. X.R.

99—139